(12) United States Patent
Schonenberg et al.

(10) Patent No.: US 6,357,661 B1
(45) Date of Patent: Mar. 19, 2002

(54) DEVICE FOR SCANNING BAR CODES

(75) Inventors: Cornelis R. J. Schonenberg, Hoofddorp; Laurentius W. Nunnink, Amersfoort, both of (NL)

(73) Assignee: Scantech B.V., Amersfoot (NL)

( * ) Notice: Subject to any disclaimer, the term of this patent is extended or adjusted under 35 U.S.C. 154(b) by 0 days.

(21) Appl. No.: 09/125,346

(22) PCT Filed: Feb. 26, 1997

(86) PCT No.: PCT/NL97/00086
§ 371 Date: Oct. 15, 1998
§ 102(e) Date: Oct. 15, 1998

(87) PCT Pub. No.: WO97/31329
PCT Pub. Date: Aug. 28, 1997

(30) Foreign Application Priority Data

Feb. 26, 1996 (NL) .............................................. 1002442
Sep. 4, 1996 (NL) .............................................. 1003957

(51) Int. Cl.[7] .......................... G02B 5/08; G02B 26/00; G06K 7/10
(52) U.S. Cl. ............................ 235/462.36; 235/462.39; 235/462.43
(58) Field of Search ............................ 235/454, 462.01, 235/462.14, 462.36, 462.39, 462.43, 383, 385, 462.38; 250/239, 568; 359/513

(56) References Cited

U.S. PATENT DOCUMENTS

| 4,762,984 A | | 8/1988 | Knowles et al. ............. 235/383 |
|---|---|---|---|
| 4,960,985 A | * | 10/1990 | Knowles .................. 235/454 X |
| 4,968,883 A | | 11/1990 | Leyshon et al. ............. 250/239 |
| 5,019,714 A | * | 5/1991 | Knowles ............. 235/462.14 X |
| 5,042,821 A | * | 8/1991 | Bontly ....................... 359/513 |
| 5,139,100 A | * | 8/1992 | Brauneis ................. 235/383 X |
| 5,149,949 A | * | 9/1992 | Wike, Jr. ............... 235/462.38 |
| 5,192,857 A | * | 3/1993 | Detwiler ................ 235/462.39 |
| 5,308,963 A | | 5/1994 | Baitz ........................... 186/62 |
| 5,475,206 A | * | 12/1995 | Reddersen et al. ..... 235/462.39 |
| 5,477,044 A | * | 12/1995 | Aragon .................. 235/472.01 |
| 5,661,297 A | * | 8/1997 | Aleshire et al. ..... 235/462.43 X |
| 5,665,955 A | * | 9/1997 | Collins, Jr. et al. ..... 235/462.14 |
| 5,783,812 A | * | 7/1998 | Chung .................... 235/462.11 |

FOREIGN PATENT DOCUMENTS

| EP | 0 595 371 A2 | | 5/1989 |
|---|---|---|---|
| EP | 0 461 673 A2 | | 6/1991 |
| EP | 0 668 567 A1 | | 11/1994 |
| JP | 2-211438 A | * | 8/1990 |
| JP | 4-105184 A | * | 4/1992 |

* cited by examiner

*Primary Examiner*—Michael G. Lee
*Assistant Examiner*—Jared J. Fureman
(74) *Attorney, Agent, or Firm*—Bell, Boyd & Lloyd LLC

(57) ABSTRACT

A scanning device for recognizing and reading bar codes is configured to have a housing that can be mounted on a scanning surface or beneath the scanning surface. The housing contains an internal scanning face unit, which includes a source of laser light, a rotatable polygonal mirror for reflecting the laser light, a plurality of fixedly disposed flat mirrors and a pick-up element for detecting radiation deflected by the bar code. This internal scanning unit can be arranged within the outer housing in four different positions, thereby creating greater flexibility with respect to the mounting of the overall housing.

14 Claims, 6 Drawing Sheets

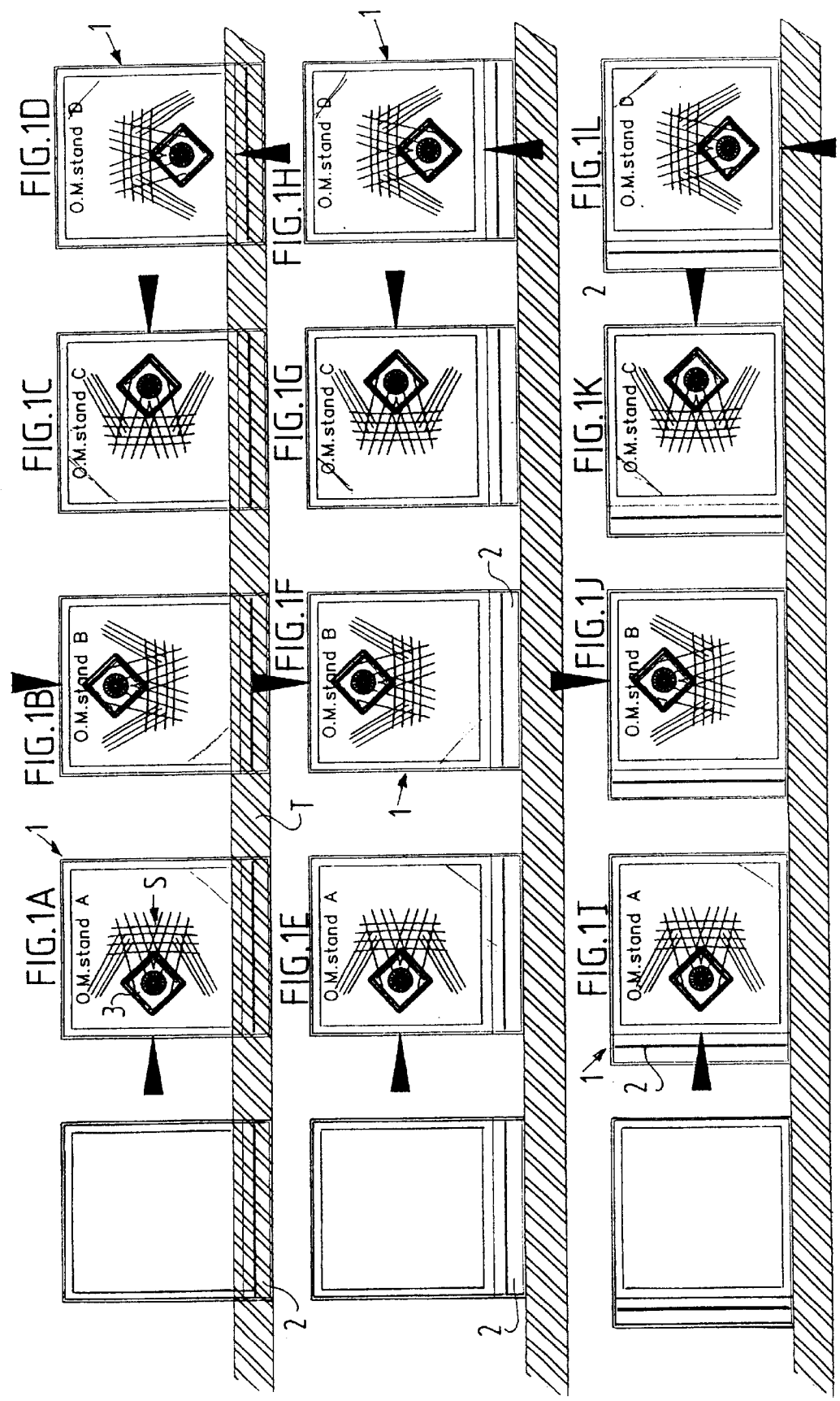

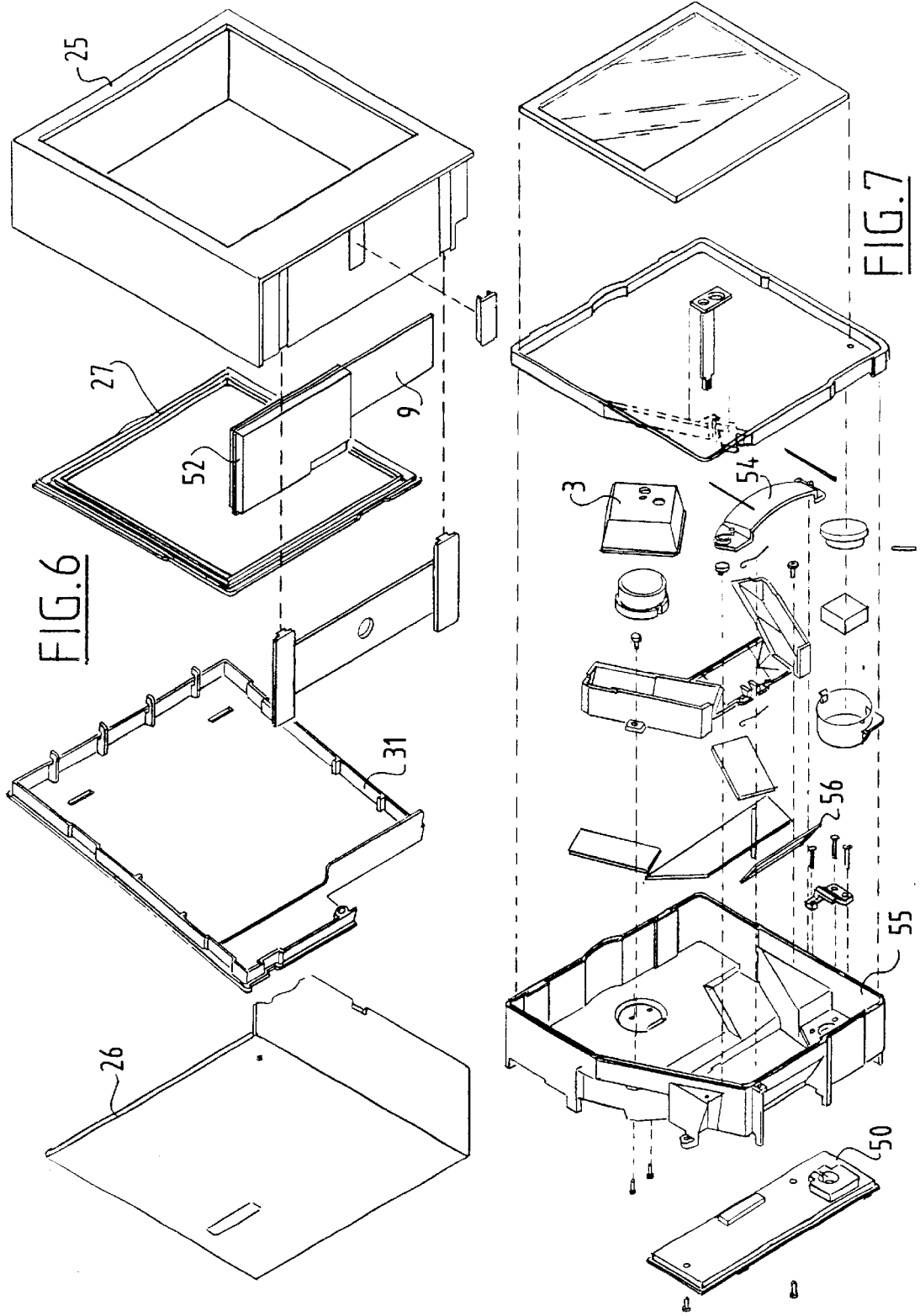

DEVICE FOR SCANNING BAR CODES

BACKGROUND OF THE INVENTION

At an increasing number of retail outlets use is being made at the checkout of scanning devices for bar codes which are arranged either lying in a table top or standing thereon. In the case of devices arranged lying in a table top the object to be paid for is moved over the transparent plate with the bar code downward whereby the transparent plate must be replaced frequently due to scratches.

In the case of scanning devices in standing position this problem does not occur. Here however the problem does occur that the space for such a scanning device in standing position is usually limited, particularly in the case that an existing scanning device must be replaced by a new version with improved operation. Scanning devices of the prior art are further designed in accordance with the desired direction of the objects for moving therealong, i.e. from left to right or from right to left.

SUMMARY OF THE INVENTION

The present invention provides a device for scanning and/or recognizing bar code, comprising:

a housing mountable standing in or on a surface; and an internal unit comprising a source of laser light, a rotatable polygonal mirror for reflecting the laser light, a plurality of fixedly disposed flat mirrors and a pick-up element for picking up radiation scattered by the bar code, wherein the internal unit is placeable in the housing in two or more positions.

The scanning device according to the present invention can be applied in highly diverse existing situations and can be built into most existing locations owing to the possibility of changing the direction of the scan lines by rotating the internal unit through one or more quarter-turns and also owing to the compact dimensions thereof.

The rotatable polygonal mirror and the lying mirrors are preferably disposed relative to each other such that scan lines are projected outward in five different directions through a transparent plate of the housing. The length of the scan lines therein extends practically over the full width of the window.

The present invention further provides a module for a scanning device which is sealable in a dustproof manner and comprises a source of laser light, a rotatable polygonal mirror for reflecting the laser light, a plurality of fixedly disposed flat mirrors and a pick-up element for picking up radiation scattered by the bar code and an inner housing which is arrangeable in an outer housing of random dimensions greater than the inner housing and which seals the components of the internal unit in dustproof manner.

This module can be coupled to an application specific to a relevant customer, for instance a manufacturer of cash register systems; in that case a specially tailored interface can also be designed for this application. This module can also be built into many existing housings owing to the compact dimensions.

BRIEF DESCRIPTION OF THE DRAWINGS

Further advantages, features and details of the present invention will be elucidated on the basis of the following description of a preferred embodiment thereof with reference to annexed drawing, wherein:

FIGS. 1A–1L show schematic front views of a possible method of arranging a preferred embodiment of a device according to the invention;

FIG. 6 shows an exploded view of the device according to FIGS. 1–5;

FIG. 7 is an exploded view of the internal unit of the device according to FIGS. 1–6;

DETAILED DESCRIPTION

FIGS. 1A–1D show a device 1 according to the present invention, a lower part 2 of which is situated below the upper level of a table top T, is for instance flush-mounted therein. Situated in the lower part 2 is a board with digital electronics and an interface connected to an electric cable which extends downward through the table top. In FIGS. 1E–1H the device 1 is placed on the table top with the lower part 2, while according to FIGS. 1I–1L the device 1 is tilted, i.e. the lower part 2 now extends sideways. Also in this tilted position of device 1 the cable for electrical connection is preferably carried downward through table top T. The tilted position according to FIGS. 1I–1L, in addition to the flush-mounted position according to FIGS. 1A–1D have the advantage relative to the positions according to FIGS. 1E–1H that an object for scanning does not have to be lifted from the table top but has only to be moved over the table top with the bar code directed toward device 1. In FIGS. 1A–1L is shown a rotatable quadrangular mirror 3 as well as scan lines S which are projected outward at at least five different angles in sets of four lines each. The scanning pattern S as drawn is visible as laser lines on the transparent plate of the device.

As can be seen in FIGS. 1A–1D, the internal unit of the device as is designated using the position of the quadrangular mirror 3 can, in each position of the housing, be arranged therein in four different positions, whereby the scanning pattern is likewise adapted to the wishes of the user, for instance whether the objects are moved from left to right or from right to left or otherwise.

Figure 2:
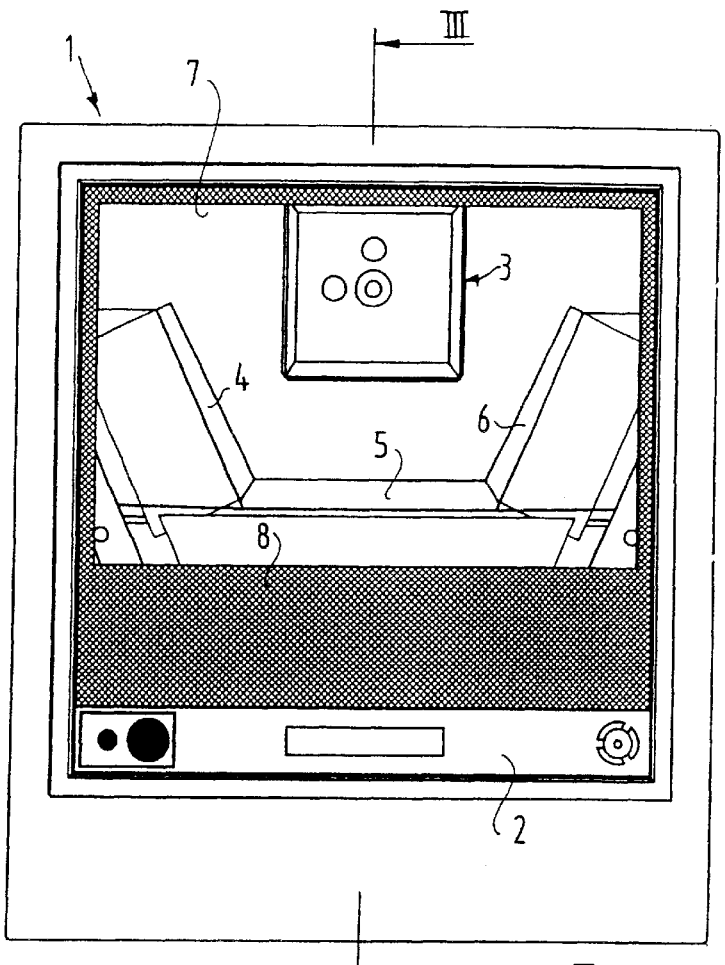
FIG. 2 shows a front view of the device of FIG. 1.

In FIG. 2 is shown the quadrangular mirror 3 which is preferably formed by a plastic element with mirror surfaces vapour-deposited thereon, in addition to fixedly disposed inclining mirrors 4, 5, 6 etc. The transparent plate 7 through which the view is taken is provided with a clear laser light-transmitting part opposite the mirrors and a dark part 8. The transparent plate 7 preferably takes a single form and is provided with a scratch-resistant coating.

Figure 3:
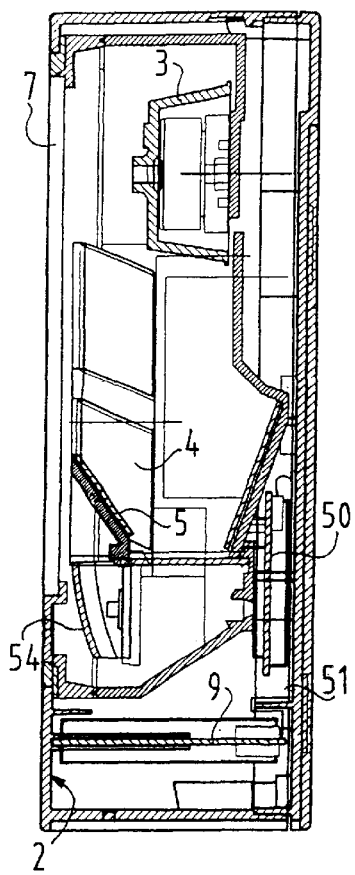
FIG. 3 shows a cross-sectional view of the device of FIGS. 1 and 2.

Further designated in FIG. 3 is a board 9 which is situated in the lower housing part 2. The rotating mirror 3 and a plurality of flat mirrors are also shown.

Figure 4:
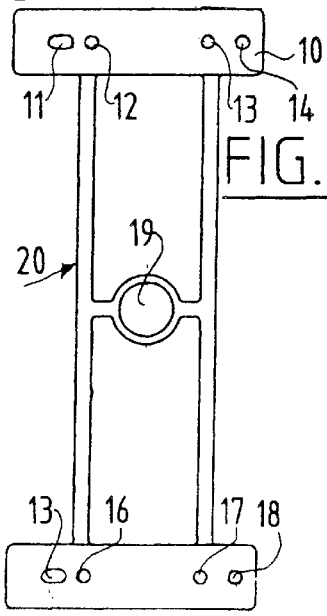
FIG. 4 shows a top view of a fixing element for fixing the device of FIGS. 1, 2 and 3.

FIG. 4 shows a mounting or console element 10 provided with a plurality of holes 11, 12, 13, 14, 15, 16, 17 and 18 for passage of mounting elements. A central opening 19 is the gate which results during injection moulding of the console element.

Figure 5:
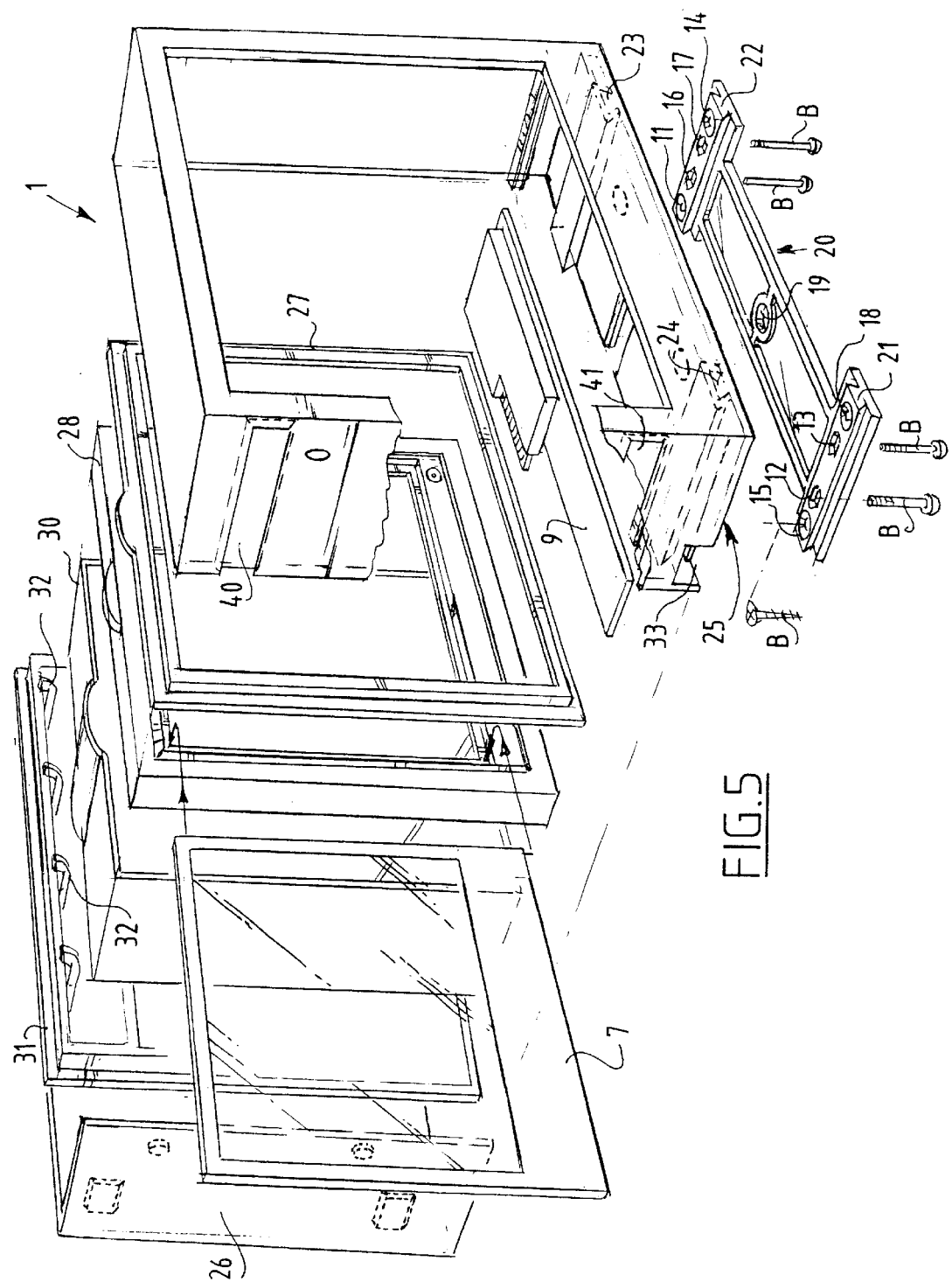
FIG. 5 shows a partly exploded and broken away view of diverse components of the device of FIGS. 1–4.

In FIGS. 5 and 6 can be seen that the holes for the mounting elements in console element 20 extend through respective standing parts 21, 22 of dovetail-like form into lower dovetail-like grooves 23 and 24 arranged in housing 25. When device 1 is mounted in the position shown in FIGS. 1E–1H, the holes 11, 14, 15 and 18 are used for screws B and the mounting element 20 is screwed onto the table, whereafter housing 25 is pushed thereon. Finally, the pushed-on position of housing 25 is fixed using a closing cover 26 of L-shaped cross section which also fixes the housing 25 in rearward direction. Closing cover 26 is provided with counter elements which fit into dovetail-like grooves 40 and 41 as well as pins with a thickened end which can be snapped into oval holes in housing 25. A flexible frame 27 is glued against frame 28. Inside frame 27, the transparent plate 7 is fitted and glued against frame 28. Frame 28 is snapped fixedly onto inner housing 30. Preferably situated between inner housing 30 and frame 28 is a labyrinth seal for dustproof sealing of the inner housing in which the mirrors and the like are situated.

Frame 27 is fitted fixedly into housing 25 during assembly. The rear plate 31 is provided with hooked ends 32 so that plate 31 can be fixed in a manner not shown with a single screw in order to further simplify assembly. In the embodiment shown in FIG. 5 an electric cable (not shown) for power supply and other electrical signals can be guided through an opening 33 in the outer housing to a board 9 on which digital electronics are situated.

In the flush-mounted positions shown in FIGS. 1A–1D use can be made of screw bolts B which are screwed into angular counter elements arranged in openings 12, 13, 16 and 17 of console 20.

Both in the position shown in FIG. 5 and in the tilted position in which the grooves 40 and 41 engage on the standing parts 21 and 22, the recess 33 is situated close to the table top, in an opening of which the cables can then be carried away.

With reference to FIG. 7 and also to FIG. 3, it is of further importance to note that a cable 51 is connected to a board 50 on which the laser light source and the receiver for the reflected laser light are situated, this preferably being a flat cable which must be connectable in all positions shown to the board 9 on which the digital electronics is situated. Arranged for this purpose on board 9 (see also FIG. 6) is an electrical connection 52 consisting of two connectors, so that contact with this connection is ensured in any rotated position of the flat cable.

Figure 8:
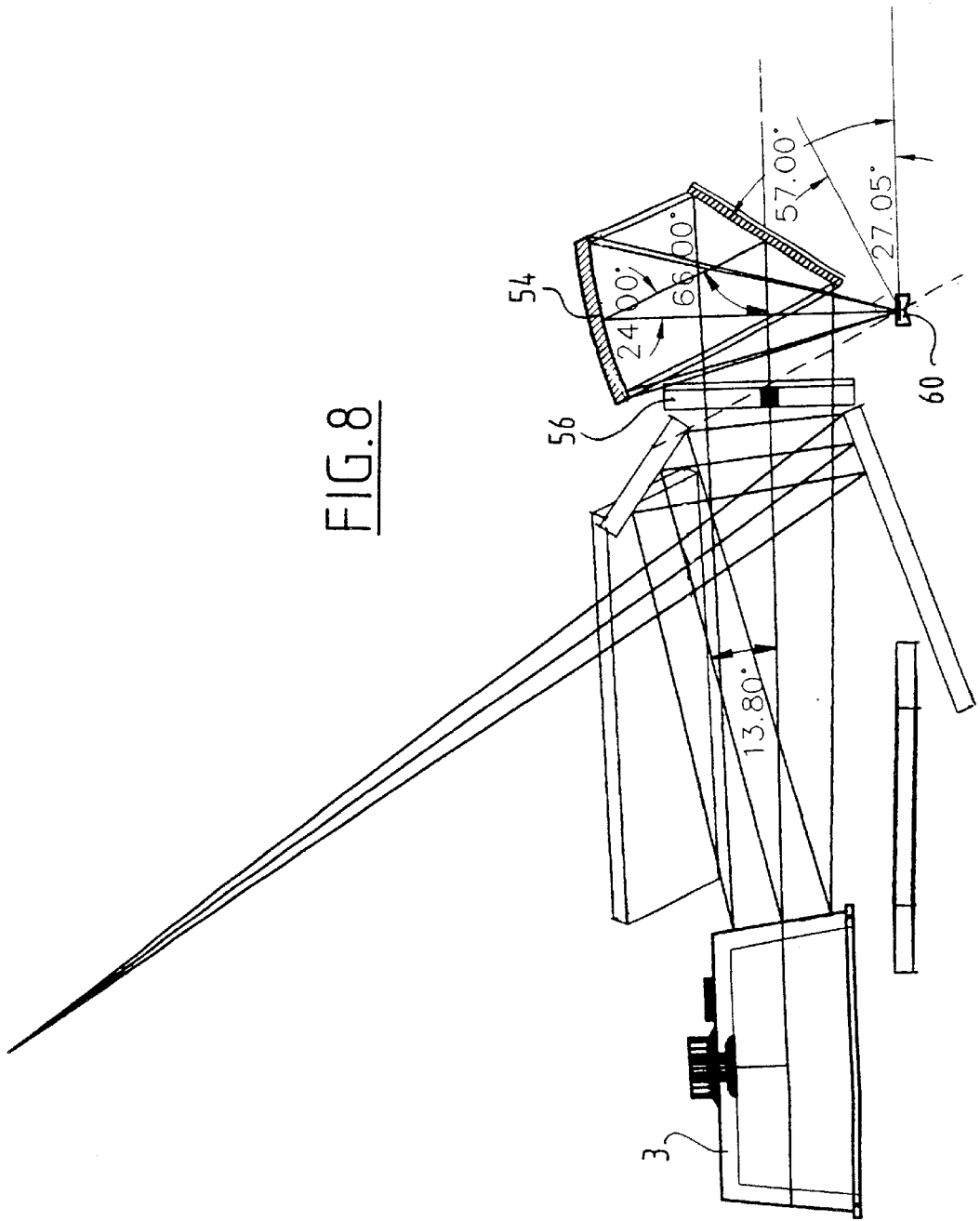
FIG. 8 is a schematic view of the radiation beams from the device shown in FIGS. 1–7.
Figure 9:
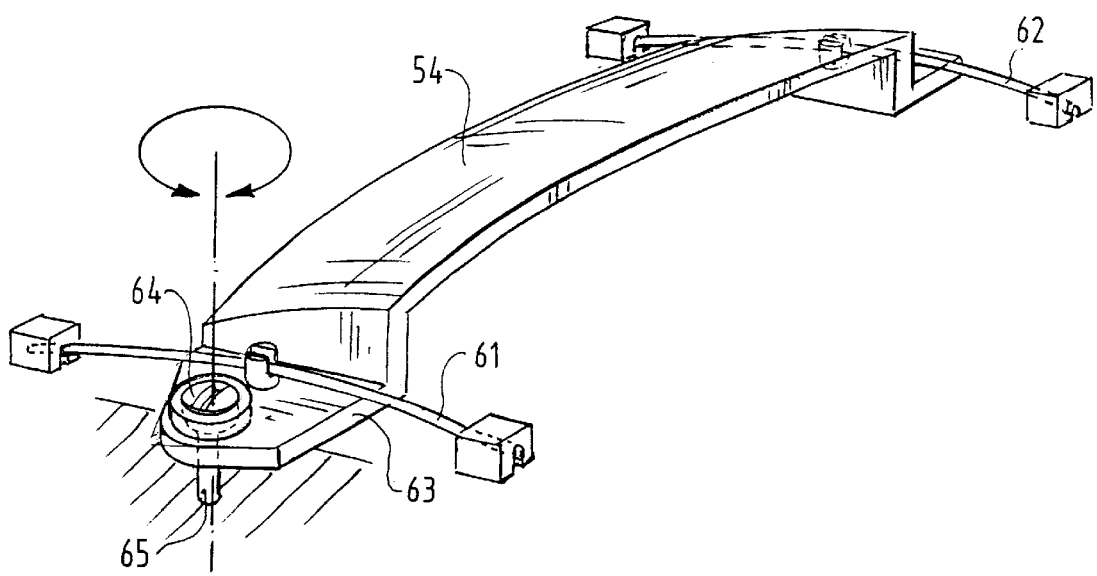
FIG. 9 is a view in perspective of the adjustment of a focussing element of FIG. 8.

Further shown in FIGS. 7, 8 and 9 is a focussing element 54, which serves to focus scattered laser light radiation to a detector 60. In order to improve the efficiency (to 99.98%) use is made here of a plastic element onto which a gold layer is vapour-deposited, whereby transmission losses such as occur in lenses are avoided. The components of the internal unit of FIG. 7 otherwise relate to the flat mirrors, the rotatable mirror, a motor therefor, and a component 55 on which all these elements are arranged and on which a dividing mirror 56 is also arranged which serves to separate the transmitted and reflected light and which, with the exception of a passage strip for the scattered laser light beams, is likewise provided with a gold coating.

For easy adjustment of focussing mirror 54 this latter is arranged using at least slightly resilient rods 61, 62, while on one side a rotatable adjusting screw 64 with a slightly eccentrically arranged pin 65 is arranged through a flange 63 on mirror 54. During assembly of the device according to the present invention a screw element 64 is turned using a screwdriver until the intensity of scattered laser light measured by the detector is at maximum. When adjusting element 64 is turned the mirror 54 is displaced counter to the spring action of rods 61 and 62.

The above described preferred embodiment of the device according to the invention is extremely compact and provides a dense scanning pattern in all desired directions, also due to the high rotation speed of the quadrangular mirror, for instance 6,000 revolutions per minute and the speed of the electronics adapted thereto.

The rights applied for are however in no way limited by the above described preferred embodiment of the present invention; the rights applied for are defined by the following claims.

What is claimed is:

1. A device for scanning and/or recognizing bar code, comprising:
   a) a scanner housing fixably mountable in or on a goods-handling counter surface; and
   b) an single internal unit arranged as a discrete unit within said housing and comprising
      i) a source of laser light,
      ii) a rotatable polygonal mirror for reflecting the laser light,
      iii) a plurality of fixedly disposed flat mirrors, and
      iv) a pick-up element for picking up radiation scattered by the bar code,
   wherein said single internal unit is placeable in said scanner housing in two or more positions having an angular difference between one another of 90 degrees or 180 degrees to change scan direction or pattern, without altering position of said scanner housing with respect to said counter.

2. The device of claim 1, wherein the internal unit is placeable in the housing in four positions.

3. The device of claim 1, wherein the housing is placeable in two or more positions relative to the surface.

4. The device of claim 1, wherein the housing can be fixed partly flush-mounted in the surface.

5. The device of claim 1, wherein the housing is provided on at least two sides with one or more grooves of dovetail-shaped cross section.

6. The device of claim 5, further comprising a mounting element with counter-elements fitting into the grooves.

7. The device of claim 1, wherein the rotatable polygonal mirror and the fixedly disposed flat mirrors are disposed relative to each other such that scan lines are projected outward in five different directions through a transparent plate of the housing.

8. The device of claim 7, wherein the transparent plate is single and provided with a scratch-resistant coating.

9. The device of claim 1, wherein the internal unit is arranged in an inner housing,
   wherein the inner housing comprises on a front side, a frame element in which a transparent plate is fixed and
   wherein the frame element is snapped with a labyrinth seal into a frame formed by the inner housing.

10. The device of claim 1, further comprising a focussing element for focussing the scattered radiation to the pick-up element,
    wherein the focussing element is formed by a substantially elliptically-shaped mirror element.

11. The device of claim 10, wherein the focussing element is formed by a gold layer vapor-deposited on an elliptically-shaped element.

12. The device of claim 10, further comprising an adjusting means for adjusting the elliptically-shaped mirror element relative to the pick-up element.

13. The device of claim 12, wherein the adjusting means comprises an eccentrically arranged pin element which is rotatable into different positions and
   wherein adjustment takes place counter to the action of resilient holding elements.

14. The device of claim 1, wherein the internal unit is arranged in an inner housing,
   wherein the inner housing seals components of the internal unit in a dustproof manner and
   wherein the inner housing is arranged in an outer housing of predefined dimensions.

* * * * *